R. S. JACOBSEN.
MEANS FOR OPERATING RECIPROCATING CONVEYERS OR SCREENS.
APPLICATION FILED SEPT. 27, 1916.

1,289,791.

Patented Dec. 31, 1918.
2 SHEETS—SHEET 1.

INVENTOR.
Richard S. Jacobsen
BY
Frank J. Schroeder
Attorney

R. S. JACOBSEN.
MEANS FOR OPERATING RECIPROCATING CONVEYERS OR SCREENS.
APPLICATION FILED SEPT. 27, 1916.

1,289,791.

Patented Dec. 31, 1918
2 SHEETS—SHEET 2.

INVENTOR
Richard S. Jacobsen
BY Frank Schraeder Jr.
Attorney

UNITED STATES PATENT OFFICE.

RICHARD S. JACOBSEN, OF CHICAGO, ILLINOIS, ASSIGNOR TO JACOBSEN & SCHRAEDER, INCORPORATED, OF CHICAGO, ILLINOIS, A CORPORATION.

MEANS FOR OPERATING RECIPROCATING CONVEYERS OR SCREENS.

1,289,791.  Specification of Letters Patent.  Patented Dec. 31, 1918.

Original application filed June 24, 1915, Serial No. 36,107. Divided and this application filed September 27, 1916. Serial No. 122,425.

*To all whom it may concern:*

Be it known that I, RICHARD S. JACOBSEN, a subject of the King of Norway, residing in the city of Chicago, county of Cook, and State of Illinois, have invented certain new and useful Improvements in Means for Operating Reciprocating Conveyers or Screens, of which the following is a specification.

This is a divisional application of my application for patent for improvements in apparatus for conveying materials filed June 24, 1915, Ser. No. 36107 and embraces particularly the means for driving such conveying apparatus or screens.

This invention relates to a novel mechanism for driving conveyers or screens with a reciprocating motion wherein the forward and backward strokes of each revolution, respectively, progressively increase and diminish in speed for the greater part of their travel. That is, this progressive acceleration or retardation is applied to approximately two-thirds of the stroke, the last third being utilized in reversing and thereby reducing the shock which would occur in a sudden reversal.

Much time and study has been devoted to the reduction or elimination of this reaction or shock due to the reversal at the end of the strokes and as a result, heavy expensive and complicated mechanisms have been devised, and in some cases heavy fly wheels and massive foundations were provided. In all of these instances, the costly mechanisms and supporting structures would not permit the use of the same for conveying purposes, and in many installations the mechanisms were fractured due to such shock or slight deviation from the essential alinement of shafts or other parts. It is therefore, an object of this invention to overcome these disadvantages and to produce a mechanism of such character that will combine efficiency and simplicity, and one that shall be low in original cost and maintenance to permit the adoption of the same for conveying purposes.

In contradistinction from the known devices the following advantages and new uses are obtained by the use of this invention:

First: The conveying trough can be made in two sections, each having a separate drive mechanism connected to and actuated by a common drive shaft, said mechanisms being arranged on said shaft in such manner, that the momentum of the trough sections will to a great degree be counter-balanced, thereby reducing the vibrations to a minimum, and permitting the use of a lighter supporting structure or foundation at greatly reduced costs.

Second: With this apparatus, the material can be conveyed forward on one trough and in reverse direction on the other trough, by arranging the troughs in stepped relation, one above the other and mounting their driving mechanisms in opposite relative positions on the common drive shaft, thereby adapting this apparatus to screening and grading. In this case, also, the momentum of one screen will counter-balance the momentum of the other.

Third: Any number of mechanisms can be mounted on and actuated by a common drive shaft.

The driving mechanism for imparting the desired motion to the conveying trough is constructed and arranged for producing a progressively increasing and decreasing speed.

To eliminate any shock due to the change in motion from the progressively increased forward direction to the progressively decreased backward movement, this progressive acceleration or progressive retardation, respectively, has only been applied to approximately two-thirds of the stroke, the last third being utilized in reversing, and thereby avoiding the shock which would result from a sudden sharp reversal.

This particular motion is obtained and imparted to the conveying trough, through the employment of an eccentric disk, rotating about and guided by an eccentric sleeve, in such manner, that the distance from the center of said eccentric to the center of the drive shaft, is constantly and uniformly changing between the maximum and minimum.

To these and other purposes my invention consists in the novel construction, combination, provision, and relative position of parts and members set forth in the following specification and accompanying drawings, and more particularly brought out in the claims.

Referring to the drawings in which like reference characters indicate like or corresponding parts, Figure 1 is an elevation taken on line 1—1 showing my improved mechanism for imparting the herein described motion to the conveying trough.

Fig. 3, also shows ordinary rollers for guiding the troughs in straight longitudinal motions.

Figure 1:
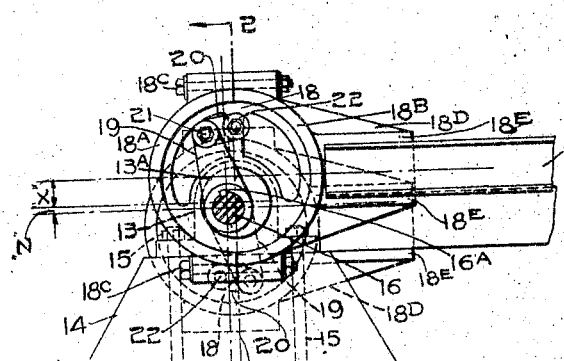
Figure 2:
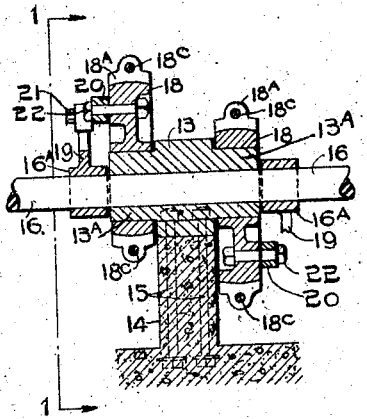
Fig. 2 is a section taken on line 2—2 of Fig. 1.

Referring to the drawing and particularly to Figs. 1 and 2, I provide an eccentric sleeve 13 which may be securely supported on the concrete pier 14 by means of bolts 15 and which is arranged to support the drive shaft 16 eccentrically with relation to the center line 17 of the sleeve 13 and whose extending ends 13ᴬ are of slightly decreased diameter to fit the bore of the disks 18.

The hub end of the crank arm 19 is rigidly connected to the drive shaft 16 by means of key 16ᴬ and the other end is connected with the disk 18 by means of link 20 and bolts or pins 21 and 22. Such links 20 being designed comparatively much shorter than the crank arms 19.

The outer eccentric member is composed of two sections 18ᴬ and 18ᴮ securely bolted together with the bolts 18ᶜ. An extending web 18ᴰ and a pair of flanges 18ᴱ afford a rigid connection for the connecting rod 23.

The distance between the center of the outside diameter of the eccentric sleeve end 13ᴬ and the center of the eccentric disk 18 is designated as "X" and the distances between the center of the outside diameter of the eccentric sleeve end 13ᴬ and the center of the drive shaft 16 are designated by "Y" and "Z". The revolution of the drive shaft 16 will cause the eccentric disk 18 to rotate about the center of drive shaft 16, through the means of the keyed crank arm 19 and link 20, with a progressively increasing and decreasing speed whose maximum and minimum corresponds to the sum and difference of "X" and "Y".

Attention is called to the relative mounting of the right and left hand eccentric disks on the eccentric sleeve, shown in Figs. 1 and 2. The momentum of the upper trough acting on the drive shaft is counter-acted by the momentum of the lower trough acting on the same shaft and the resulting moment transmitted to the supporting structure through sleeves 13 is equal to the difference of said momentums.

In Figs. 3 to 6 inclusive, a form of my invention is represented for horizontally conveying material in two directions, forward and backward. Both upper and lower troughs are composed of the side channels 24ᴬ and bottom plate 25. A cross rod 26 is mounted in the bearings 27 which are suitably and rigidly connected with the trough. A pair of connecting rods 23 connect the cross rod 26 with the impelling eccentric disks 18 through members 18ᴬ and 18ᴮ.

Figure 3:
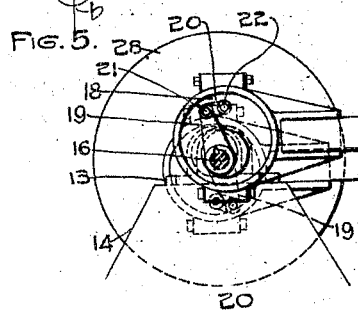
Fig. 3 shows a sectional elevation of my invention taken on line 3—3 of Fig. 4, as applied to a pair of balanced troughs arranged to convey the material in a forward direction on the top trough and in reverse direction on the lower trough.
Figure 4:
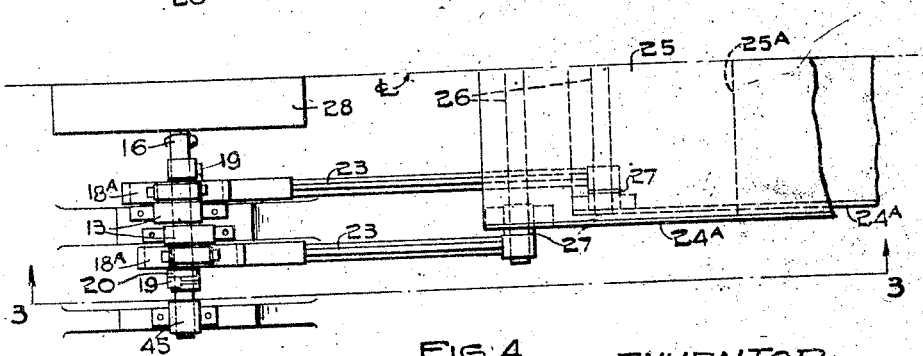
Fig. 4 is a half plan of Fig. 3.

The impulse imparted to the material on the lower conveying trough in Fig. 3 whereby it travels in the reverse direction and discharges through opening 25ᴬ, is attained by the use of the opposite hand eccentric disks 18 and sleeves 13, as shown on the half plan Fig. 4.

A belt driven pulley 28 keyed to the drive shaft 16 imparts power thereto from any well known source of power. A pair of standard bearing boxes 45 may be provided for the drive shaft ends.

Referring now to Figs. 3 and 4 I provide flanged rollers 29 which suitably support the conveying troughs.

Figures 5, 6:
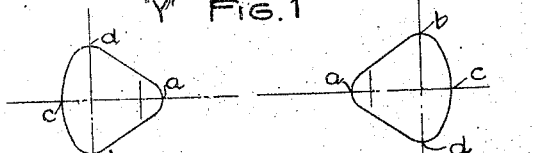
Figs. 5 and 6 illustrate the motion and speed diagrams of the troughs conveying material in opposite directions.

Figs. 5 and 6 represent the motion and speed diagrams of the lower and upper troughs respectively shown by Figs. 3 and 4. The speed increases approximately uniformly or progressively from $a$ to $b$, decreases quickly from $b$ to $c$, increases again from $c$ to $d$ in the same manner, and finally is retarded uniformly from $d$ to $a$. According to Figs. 5 and 6 this progressively accelerated or retarded motion, respectively, takes place during about seventy-five per cent. of each revolution and seventy per cent. of the stroke. The other part of the motion serves for the reversal of the moving parts and ought not be made smaller if the device is to be worked without injurious shock.

It will be observed that the speed of the forward and backward strokes of each revolution are reversedly identical and that the strokes progressively increase and diminish in speed for the greater part of their travel.

Figure 7:
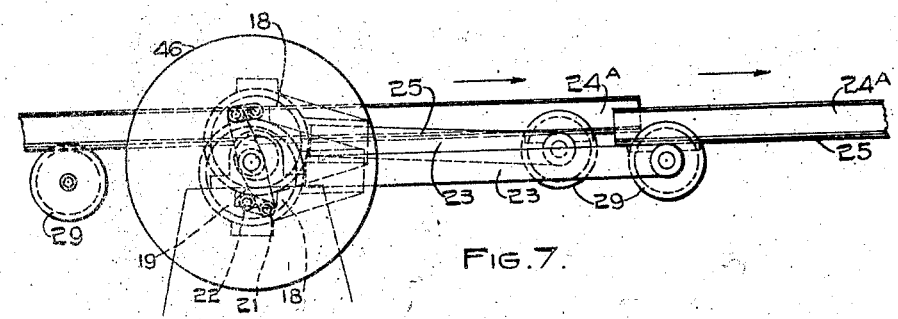
Fig. 7 shows the application of my invention to a pair of balanced troughs arranged to convey the material forwardly, from one trough to the other.
Figure 8:
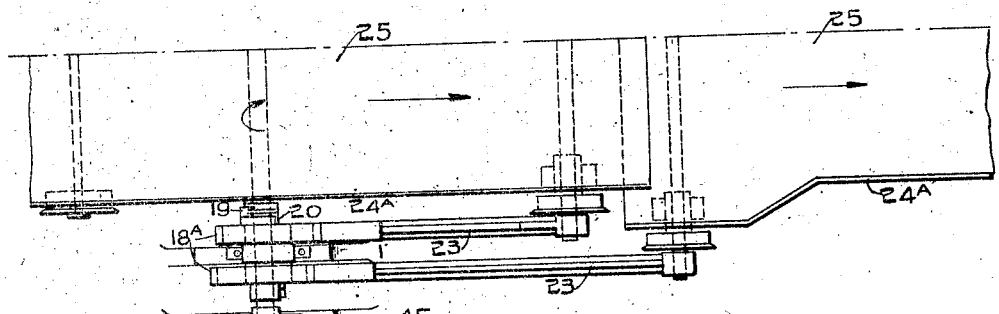
Fig. 8 is a half plan of Fig. 7.

Figs. 7 and 8 illustrate an application of the pair of eccentric disks 18 and eccentric bearing 13 shown in detail by Figs. 1 and 2. Here the material is conveyed in one direction from one trough to the other, and in this application, use is made of a single eccentric sleeve to support a pair of opposite hand, balanced eccentric disks, so that the motion of the material on both troughs is in the same direction. The end shaft 13ᶜ bearings 45 are provided as in the application shown by Figs. 3 to 6 inclusive, but in this case, the belt driven pulley 46 is overhung at one end of the drive shaft 16. The connecting rods 23 and rollers 29 are similar to those above described.

Figures 9, 10:
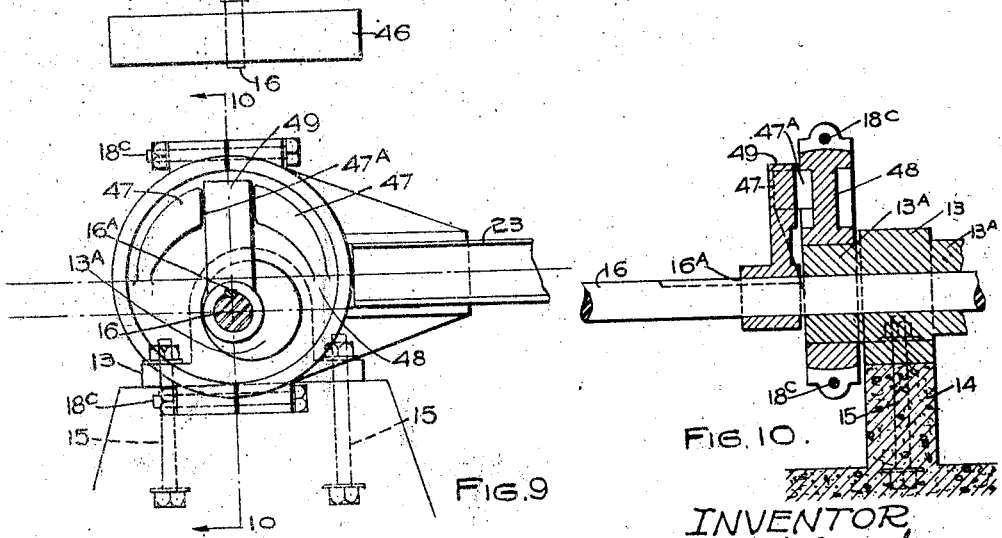
Figs. 9 and 10 illustrate, respectively, a side elevation and section of a modified eccentric disk and crank-arm construction with the link omitted.

Figs. 9 and 10 illustrate a modified form of my invention. In this construction, the link 20 and pins or bolts 21 and 22 are omitted and a pair of lugs 47 extend from the face of the eccentric disk 48 and continually embrace the straight crank-arm 49 as it rotates about the drive shaft 16 to which it is keyed and as it slides between the planes 47ᴬ of the lugs 47.

Other parts of the mechanism are similar in construction to that shown by Figs. 1 and 2, and in operation, it is obvious that as the drive shaft 16 rotates clockwise, the straight crank-arm 49 being keyed to said shaft 16 will rotate about the same and cause the eccentric disk 48 to revolve about the supporting eccentric sleeve end 13ᴬ. The relative position of the centers of drive shaft 16, the eccentric disk 48 and the outside diameter of the eccentric sleeve end 13ᴬ is substantially identical with the centers of the mechanism herein described and illustrated by Figs. 1 and 2.

I claim:

1. Means for operating reciprocating conveyers or screens comprising a uniformly rotating drive shaft, a bearing for said shaft having an eccentric mounting, the center of said shaft being non-coincident with the vertical and horizontal center lines of said eccentric mounting, a driving crank arm rigid with said shaft, a disk loosely mounted on said eccentric mounting, operating members engaging with said disk, and means comprising a link comparatively shorter than said crank arm whereby said disk is held in constant connection with said crank for receiving power therefrom for imparting to said members a reciprocating motion wherein the speeds of the forward and backward strokes of each revolution are reversedly identical and wherein such strokes progressively increase and diminish in speed for the greater part of their travel.

2. Means for operating reciprocating conveyers or screens, comprising a straight drive shaft, a plurality of bearings for supporting said shaft eccentrically with relation to the vertical and horizontal center lines of the outside diameter of the ends thereof, mechanism including eccentric disks mounted on the ends of said bearings, crank arms rigidly connected to said drive shaft, a link connecting each crank arm with an eccentric disk, said links being comparatively shorter than said crank arms, and connecting rods extending from said mechanism and pivotally supported at their other ends, the momentum of one rod counteracting the momentum of another rod, said mechanism imparting a reciprocatory motion wherein the speed of the forward and backward strokes of each revolution are reversedly identical and wherein such strokes progressively increase and diminish in speed for the greater part of their travel.

3. Means for operating reciprocating conveyers or screens comprising a straight continuous drive shaft, a mechanism including a driving crank mounted on said shaft, an eccentric bearing held in constant fixed relation to the center of revolution of said driving crank, the center of said shaft being non-coincident with the vertical and horizontal center lines of said bearing, a power-transmitting eccentric disk arranged to rotate about said eccentric bearing, operating members connected to said mechanism, means whereby said eccentric disk is connected to said crank to receive power therefrom for imparting to said members a progressively accelerating motion in one direction with a reverse movement quick at first and progressively retarded in speed in the opposite direction wherein the speed of the forward and backward strokes of each revolution are reversedly identical, the momentum of said members counter-acting each other, said acceleration and retardation being for the greater part of each stroke.

4. Means for operating reciprocating conveyers or screens, comprising a drive shaft, a plurality of bearings for supporting said shaft eccentrically with relation to the vertical and horizontal center lines of the outer diameter of the ends of said bearings, eccentric disk mechanisms mounted on the eccentric ends of said bearings, crank arms rigidly connected to said drive shaft, a link connecting each crank arm with an eccentric disk mechanism, said links being comparatively shorter than said crank arms, and connecting means extending directly from said disk mechanisms for imparting a reciprocating motion substantially as described.

5. Means for operating reciprocating conveyers or screens, comprising a drive shaft, a bearing supporting said shaft eccentrically in relation to the vertical and horizontal center lines of the outer diameter of the end of said bearing, a crank arm rigidly mounted on said shaft, an eccentric disk mounted on the eccentric end of said bearing, a link connecting the crank arm with the eccentric disk, said link being comparatively shorter than said crank arm, and a connecting rod extending from its support directly to said disk for actuating said support with a reciprocating motion wherein the speed of the forward and backward strokes, of each revolution are reversedly identical and wherein such strokes, respectively, uniformly increase and diminish in speed for the greater part of their travel.

6. A bearing member having interior and exterior eccentrically arranged bearing surfaces, a driving shaft and a driven member respectively mounted in and upon said surfaces, the center of said shaft being non-coincident with the vertical and horizontal center lines of said exterior bearing surface, and driving connections between said shaft and the driven member.

In witness whereof, I have hereunto subscribed my name this 18th day of September, 1916.

RICHARD S. JACOBSEN.